United States Patent
Soga et al.

(10) Patent No.: US 12,535,107 B2
(45) Date of Patent: Jan. 27, 2026

(54) ANGULAR BALL BEARING

(71) Applicant: NSK LTD., Tokyo (JP)

(72) Inventors: Shuji Soga, Fujisawa (JP); Yoshiaki Katsuno, Fujisawa (JP)

(73) Assignee: NSK LTD., Tokyo (JP)

(*) Notice: Subject to any disclaimer, the term of this patent is extended or adjusted under 35 U.S.C. 154(b) by 94 days.

(21) Appl. No.: 18/246,816

(22) PCT Filed: Sep. 15, 2021

(86) PCT No.: PCT/JP2021/034012
§ 371 (c)(1),
(2) Date: Mar. 27, 2023

(87) PCT Pub. No.: WO2022/065171
PCT Pub. Date: Mar. 31, 2022

(65) Prior Publication Data
US 2023/0358277 A1    Nov. 9, 2023

(30) Foreign Application Priority Data

Sep. 28, 2020 (JP) .................................. 2020-162504

(51) Int. Cl.
*F16C 33/58* (2006.01)
*F16C 19/16* (2006.01)

(52) U.S. Cl.
CPC ............ *F16C 33/585* (2013.01); *F16C 19/16* (2013.01)

(58) Field of Classification Search
CPC ..... F16C 19/163; F16C 19/181; F16C 33/585
See application file for complete search history.

(56) References Cited

U.S. PATENT DOCUMENTS 6,176,805 B1 *   1/2001   Itoh ........................ F16H 57/04
                                                                   384/615
6,481,898 B1   11/2002   Yakura
(Continued)

FOREIGN PATENT DOCUMENTS

JP    5-86026 U     11/1993
JP    9-177795 A    7/1997
(Continued)

OTHER PUBLICATIONS

International Search Report (PCT/ISA/210) dated Nov. 22, 2021 by the ISA in International Application No. PCT/JP2021/034012.
(Continued)

*Primary Examiner* — John Olszewski
*Assistant Examiner* — Aimee Tran Nguyen
(74) *Attorney, Agent, or Firm* — Sughrue Mion, PLLC

(57) ABSTRACT

A groove curvature radius ratio Ri of the inner ring raceway groove to a ball diameter is 54% to 58%, a groove curvature radius ratio Ro of an outer ring raceway groove of an outer ring to the ball diameter is 51% to 58%, and Ri−Ro≥0 points. At least an inner ring raceway groove of an inner ring has a maximum surface pressure of 4.7 GPa to 6.0 GPa when a sum of permanent deformation amounts of the ball and the inner ring raceway groove at a center of a contact portion between a ball of an angular ball bearing and the inner ring raceway groove is 1/10,000 of the ball diameter. Accordingly, it is possible to provide the angular ball bearing that can reduce the heat generation amount, and that can reduce the damage caused by the external impact load in the stationary state.

9 Claims, 9 Drawing Sheets

(56) References Cited

U.S. PATENT DOCUMENTS

| | | | |
|---|---|---|---|
| RE48,336 E | 12/2020 | Ueda et al. | |
| 2005/0160602 A1 | 7/2005 | Shibata et al. | |
| 2009/0038713 A1 | 2/2009 | Ueda et al. | |
| 2011/0142388 A1* | 6/2011 | Maejima | F16C 33/58 903/902 |
| 2014/0348454 A1 | 11/2014 | Ueno et al. | |

FOREIGN PATENT DOCUMENTS

| | | | |
|---|---|---|---|
| JP | 2003-329048 A | | 11/2003 |
| JP | 2004100867 A | * | 4/2004 |
| JP | 2004-316816 A | | 11/2004 |
| JP | 2005-076679 A | | 3/2005 |
| JP | 2005-240881 A | | 9/2005 |
| JP | 2008-32169 A | | 2/2008 |
| JP | 2008032169 A | * | 2/2008 |
| JP | 2008-267402 A | | 11/2008 |
| JP | 2008-291341 A | | 12/2008 |
| JP | 2014-25502 A | | 2/2014 |
| WO | 00/37813 A1 | | 6/2000 |

OTHER PUBLICATIONS

Written Opinion (PCT/ISA/237) dated Nov. 22, 2021 by the ISA in International Application No. PCT/JP2021/034012.
European Extended Search Report issued Feb. 2, 2024 by the European Patent Office for EP Patent Application No. 21872301.3.
Communication dated Aug. 8, 2025, issued by the Japanese Patent Office in Japanese Application No. 2022-551924.

* cited by examiner

ANGULAR BALL BEARING

CROSS REFERENCE TO RELATED APPLICATIONS

This application is a National Stage of International Application No. PCT/JP2021/034012 filed on Sep. 15, 2021 claiming priority from Japanese Patent Application No. 2020-162504 filed on Sep. 28, 2020, the disclosures of which are incorporated herein in their entirety by reference.

TECHNICAL FIELD

The present invention relates to an angular ball bearing, and particularly to a ball bearing used for various machine tool spindles, motors, and the like.

BACKGROUND ART

In recent years, the speed of a spindle has been increased in order to improve the machining efficiency and the productivity of a machine tool, and accordingly, the rotational speed of an angular ball bearing used for the machine tool spindle is also increasing. In general, when the angular ball bearing rotates at a high speed, a large slip due to a spin motion or a gyro motion occurs at a contact point between a ball and a raceway surface. Due to the influence of the centrifugal force acting on an inner ring and the ball, the clearance inside the bearing decreases and the contact surface pressure between the ball and the raceway surface increases. As a result, heat generation increases. When the heat generation amount increases, the viscosity of the oil may decrease, an oil film may break at a rolling contact portion between the ball and a bearing ring, the bearing may be seized, the thermal displacement of the spindle may increase, and the machining accuracy may deteriorate.

As a related-art technique for reducing the heat generation amount of the angular ball bearing, for example, a technique (see Patent Literature 1) in which the groove curvature radius ratio of an outer ring is set to 50.5% to 53% and the groove curvature radius ratio of an inner ring is set to 52.5% to 60%, and a technique (see Patent Literature 2) in which both the groove curvature radius ratio of the outer ring and the groove curvature radius ratio of the inner ring are set to 54% to 57% are known.

CITATION LIST

Patent Literature

Patent Literature 1: WO2000/37813A
Patent Literature 2: JP2005-240881A

SUMMARY OF INVENTION

Technical Problem

However, in Patent Literatures 1 and 2, although the low heat generation is achieved by setting the groove curvature radius ratios of the outer ring and the inner ring to be large, the surface pressure of the contact portion between a rolling element and a raceway surface tends to be high. When the bearing is viewed from a side surface in the axial direction, the contact portion between the rolling element and the raceway surface of the inner ring and the contact portion between the rolling element and the raceway surface of the outer ring are respectively the contact between the outer peripheral portion of a rolling element arc and the outer peripheral portion of an inner ring raceway surface arc, and the contact between the outer peripheral portion of the rolling element arc and the inner peripheral portion of an outer ring raceway surface arc. Therefore, the contact surface pressure on the raceway surface of the inner ring tends to be particularly high. Therefore, when the external impact load is applied to the angular ball bearing in the stationary state, an indentation is likely to be generated in the inner ring raceway surface. Here, the external impact load is not a machining load that is applied during the normal cutting, but is a collision load due to an unexpected interference of the spindle (including parts up to the blade) with a workpiece, a jig, and a component constituting a machine tool in a machining chamber, an unclamp load at the time of replacing the blade, and a load due to an unexpected collision during the assembly process of the spindle and the vibration and the impact that the bearing receives when transporting the bearing alone. The external impact load is a large load that is one digit or more larger than the machining load during operation. Therefore, when the operation is performed in a state in which an indentation is generated in the raceway surface due to the external impact load, the vibration may occur and the quality of the machined surface of the workpiece may decrease, or peeling may occur from the indentation in the raceway surface as a starting point.

The present invention has been made in order to solve such a problem, and the object of the present invention is to provide an angular ball bearing capable of reducing the heat generation amount and capable of reducing the damage caused by the external impact load in the stationary state.

Solution to Problem

In order to solve the above problem, the present invention provides an angular ball bearing described below.
(1) An angular ball bearing including:
an inner ring that has an inner ring raceway groove having an arc-shaped cross section on an outer peripheral surface of the inner ring;
an outer ring that has an outer ring raceway groove having an arc-shaped cross section on an inner peripheral surface of the outer ring; and
a plurality of balls rollably provided between the inner ring raceway groove and the outer ring raceway groove,
in which a groove curvature radius ratio (Ri) of the inner ring raceway groove to a ball diameter is 54% to 58%, a groove curvature radius ratio (Ro) of the outer ring raceway groove to the ball diameter is 51% to 58%, and Ri−Ro≥0 points, and
in which at least the inner ring raceway groove has a maximum surface pressure of 4.7 GPa to 6.0 GPa when a sum of permanent deformation amounts of the ball and the inner ring raceway groove at a center of a contact portion between the ball and the inner ring raceway groove is 1/10,000 of the ball diameter.
(2) The angular ball bearing according to (1),
in which Ri−Ro≥1 point.
(3) The angular ball bearing according to (1) or (2),
in which a cured surface layer obtained by machining is formed on at least the inner ring raceway groove.
(4) The angular ball bearing according to (1) or (2),
in which a cured surface layer obtained by machining is formed only on the inner ring raceway groove of the inner ring raceway groove and the outer ring raceway groove.

(5) The angular ball bearing according to any one of (1) to (4),
in which a material of the ball is ceramic.
(6) The angular ball bearing according to any one of (1) to (5),
in which a ratio value of ball diameter/cross-sectional height is 0.39 to 0.65 times.
(7) The angular ball bearing according to (6),
in which the ratio value of ball diameter/cross-sectional height is 0.55 to 0.65.
(8) The angular ball bearing according to any one of (1) to (7) being an angular ball bearing that is used for a machine tool spindle having dmn of 800,000 or more and that is pre-loaded.
(9) The angular ball bearing according to any one of (1) to (8),
in which at least one of the inner ring and the outer ring is formed of steel containing 0.2% by mass to 1.2% by mass of C, 0.7% by mass to 1.5% by mass of Si, 0.5% by mass to 1.5% by mass of Mo, 0.5% by mass to 2.0% by mass of Cr, balance Fe, and an unavoidable impurity element, and
in which a surface carbon concentration is 0.8% by mass to 1.3% by mass, and a surface nitrogen concentration is 0.2% by mass to 0.8% by mass.

Advantageous Effects of Invention

According to the angular ball bearing in the present invention, it is possible to reduce the heat generation amount, and it is possible to reduce the damage caused by the external impact load in the stationary state. In particular, the angular ball bearing according to the present invention is useful as an angular ball bearing for a machine tool spindle used in the high speed rotation of dmn 800,000 or higher.

BRIEF DESCRIPTION OF DRAWINGS

FIGS. 4A to 4C are schematic views showing the spin slip, in which
FIG. 4A is a view showing a direction in which a centrifugal force acts,
FIG. 4B is a view showing the spin amount when the inner ring groove curvature radius ratio is large,
and FIG. 4C is a view showing the spin amount when the inner ring groove curvature radius ratio is small.

DESCRIPTION OF EMBODIMENTS

Figure 1:
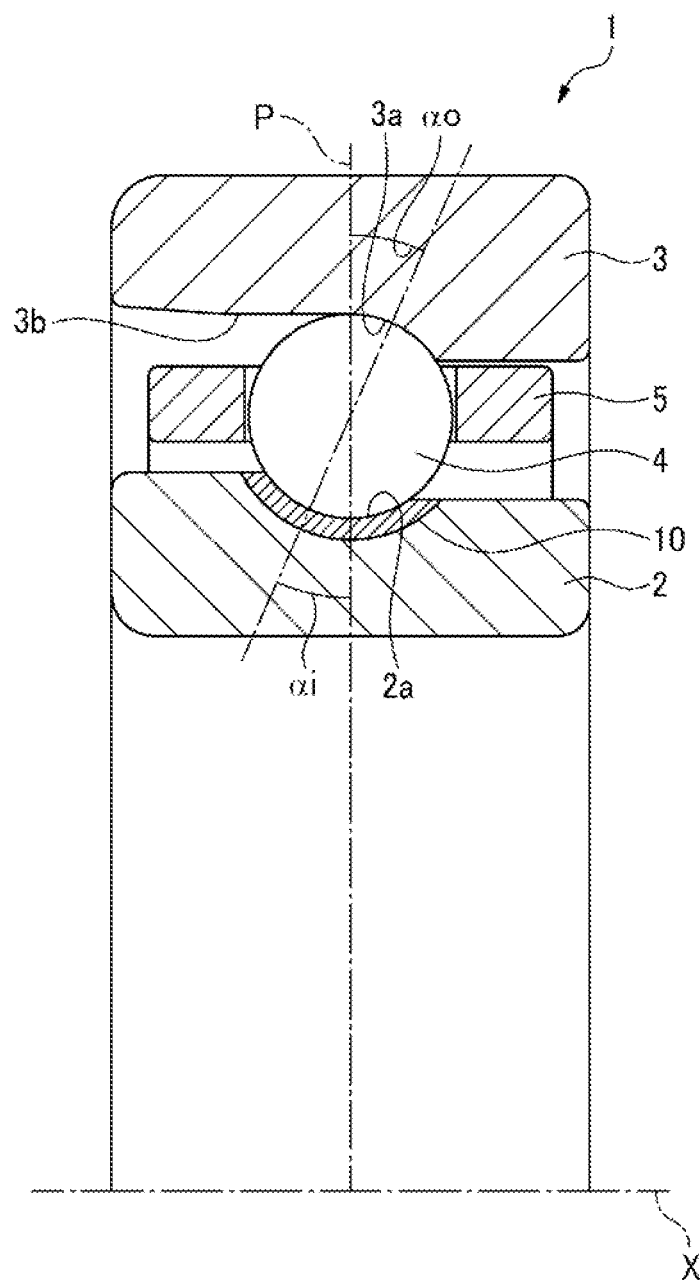
FIG. 1 is a partially enlarged cross-sectional view of an angular ball bearing which is an example of a ball bearing according to the present invention.

Hereinafter, an angular ball bearing according to an embodiment of the present invention will be described in detail with reference to the drawings.
In the specification of the application, "—" indicating a numerical range is used in the meaning of including numerical values described before and after "—" as a lower limit value and an upper limit value.
FIG. 1 shows an angular ball bearing used for a machine tool spindle as an example of an angular ball bearing according to the present invention. An angular ball bearing 1 includes an inner ring 2 that has an inner ring raceway groove 2a having an arc-shaped cross section on the outer peripheral surface of the inner ring 2, an outer ring 3 that has an outer ring raceway groove 3a having an arc-shaped cross section on the inner peripheral surface of the outer ring 3, a plurality of balls 4 provided rollably between the inner ring raceway groove 2a and the outer ring raceway groove 3a, and a cage 5 that holds the plurality of balls 4. A counter bore 3b is formed on one side of the inner peripheral surface of the outer ring 3 in the axial direction, and the ball 4 is provided between the inner ring raceway groove 2a and the outer ring raceway groove 3a with contact angles αi and αo. The contact angles αi and αo are defined as angles between a plane P perpendicular to a bearing axis X and action lines. The action lines connect contact points where the ball 4 comes into contact with the inner ring 2 and the outer ring 3 and the center of the ball 4.
The ball 4 has a ratio value of ball diameter/cross-sectional height, that is, diameter of the ball 4/{(outer diameter of outer ring 3−inner diameter of inner ring 2)/2} of 0.39 to 0.65, preferably 0.55 to 0.65.
In the inner ring raceway groove 2a and the outer ring raceway groove 3a, the groove curvature radius ratio (Ri=curvature radius of inner ring raceway groove/ball diameter) of the inner ring raceway groove 2a to the ball diameter is 54% to 58%, the groove curvature radius ratio (Ro=curvature radius of outer ring raceway groove/ball diameter) of the outer ring raceway groove 3a to the ball diameter is 51% to 58%, and it is set that Ri−Ro≥0 points, preferably Ri−Ro≥1 point. Hereinafter, the groove curvature radius ratio Ri of the inner ring raceway groove 2a to the ball diameter is also referred to as an inner ring groove curvature radius ratio Ri, and the groove curvature radius ratio Ro of the outer ring raceway groove 3a to the ball diameter is also referred to as an outer ring groove curvature radius ratio Ro.

Further, in the present embodiment, a cured surface layer 10 is formed in the inner ring raceway groove 2a by roller burnishing, which is machining, and the inner ring raceway groove 2a has a maximum surface pressure of 4.7 GPa to 6.0 GPa when the sum of the permanent deformation amounts of the ball 4 and the inner ring raceway groove 2a at the center of the contact portion between the ball 4 and the inner ring raceway groove 2a is 1/10,000 of the ball diameter. On the other hand, the outer ring raceway groove 3a is not subjected to the roller burnishing, and no cured surface layer is formed.

The roller burnishing is performed after the inner ring raceway groove 2a of the inner ring 2 formed by cutting has been subjected to the heat treatment and the finish machining has been performed. Further, if necessary, precision machining may be performed after the roller burnishing step.

Hereinafter, the critical significance of the groove curvature radius ratios Ri and Ro of the raceway grooves 2a and 3a described above, the maximum surface pressure when the sum of the permanent deformation amounts of the ball 4 and the inner ring raceway groove 2a described above in the inner ring raceway groove 2a is 1/10,000 of the ball diameter, and the ball diameter will be described.

[Groove Curvature Radius Ratio (Ri) of Inner Ring Raceway Groove to Ball Diameter is 54% to 58%, and Groove Curvature Radius Ratio (Ro) of Outer Ring Raceway Groove to Ball Diameter is 51% to 58%]

Figure 2:
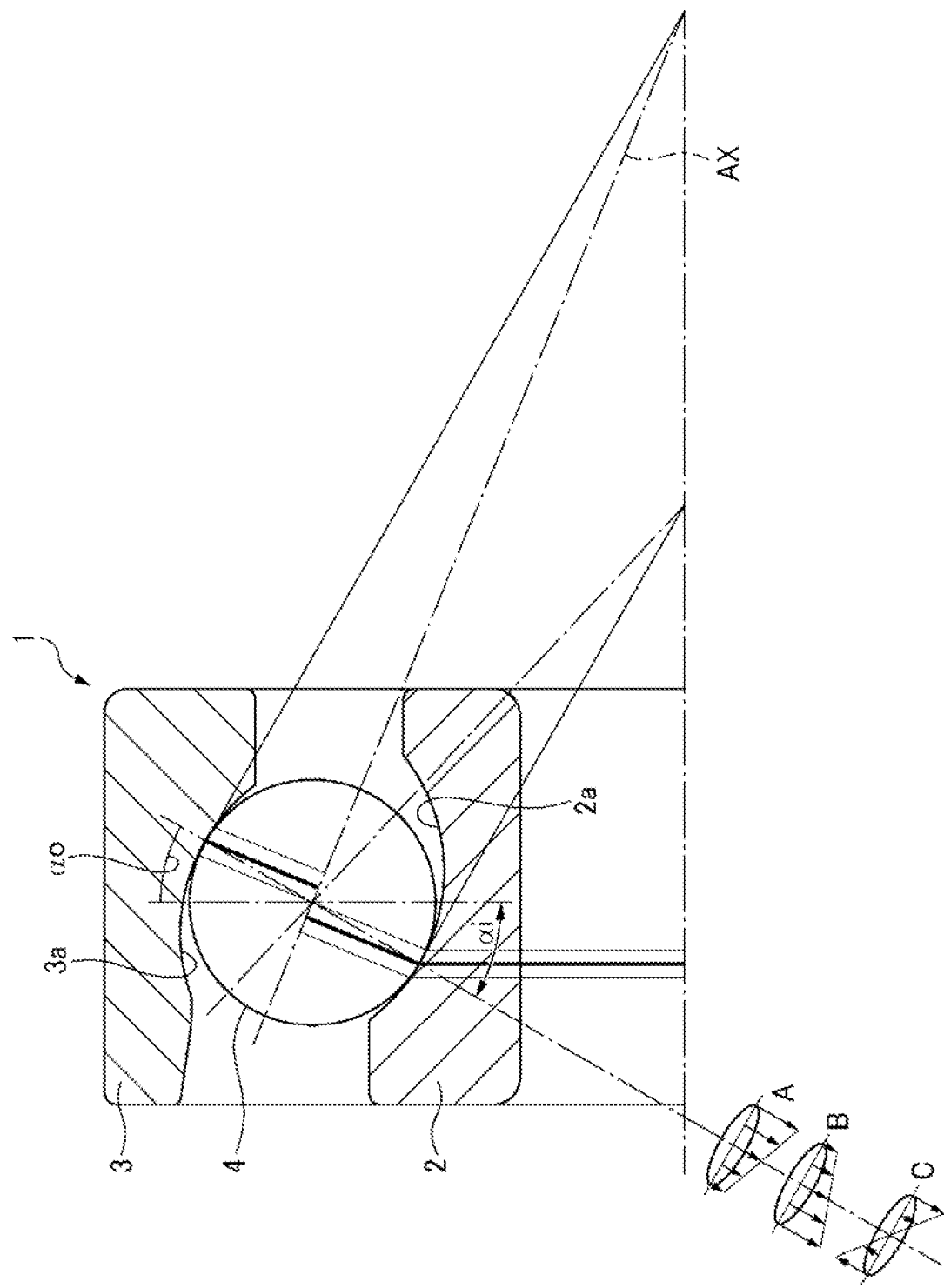
FIG. 2 is a schematic view showing spin slip.
Figure 3:
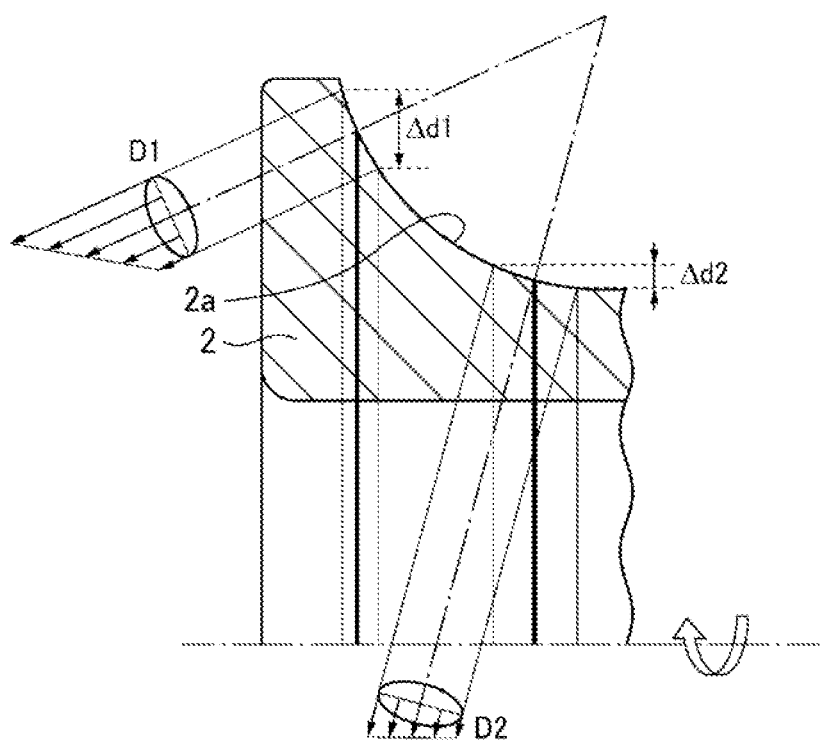
FIG. 3 is a schematic view showing the spin slip, and is a view showing an inner ring raceway groove of an inner ring in an enlarged manner.

First, in the angular ball bearing 1 for high speed rotation used in the machine tool spindle, as shown in FIG. 2, assuming that the ball 4 purely rolls in the outer ring raceway groove 3a of the outer ring 3, in the contact portion (the contact ellipse) between the inner ring raceway groove 2a of the inner ring 2 and the surface of the ball 4, a relative circumferential speed (a reference sign C in the figure) between the circumferential speed (indicated by a reference sign A in the figure and proportional to the vertical distance from a rotation axis AX of the ball 4 to the arc of the outer peripheral surface of the ball 4) on the surface of the ball 4 due to the rotation and the circumferential speed (indicated by a reference sign B in the figure and proportional to the vertical distance from the rotation axis of the inner ring 2 to the inner ring raceway groove 2a) on the inner ring raceway groove 2a of the inner ring 2 due to the revolution appears as a spin slip. As indicated by reference signs D1 and D2 in FIG. 3, as the contact angle αi increases, the circumferential speed on the inner ring raceway groove 2a of the inner ring 2 due to the revolution increases, and as the long radius of the contact ellipse formed by the contact surface between the ball 4 and the inner ring raceway groove 2a increases, the circumferential speed difference (indicated by Δd1 and Δd2 in the figure, and Δd1>Δd2) between both ends of the contact ellipse increases, whereby the relative circumferential speed C also increases. Therefore, in order to prevent the spin slip, it is effective to reduce the circumferential speed on the inner ring raceway groove 2a of the inner ring 2 due to the revolution in the contact portion between the ball 4 and the inner ring raceway groove 2a, and to reduce the long radius of the contact ellipse formed by the contact surface between the ball 4 and the inner ring raceway groove 2a. In FIG. 2, the reference sign AX denotes the rotation axis of the ball 4 of the outer ring control.

Figure 4A:
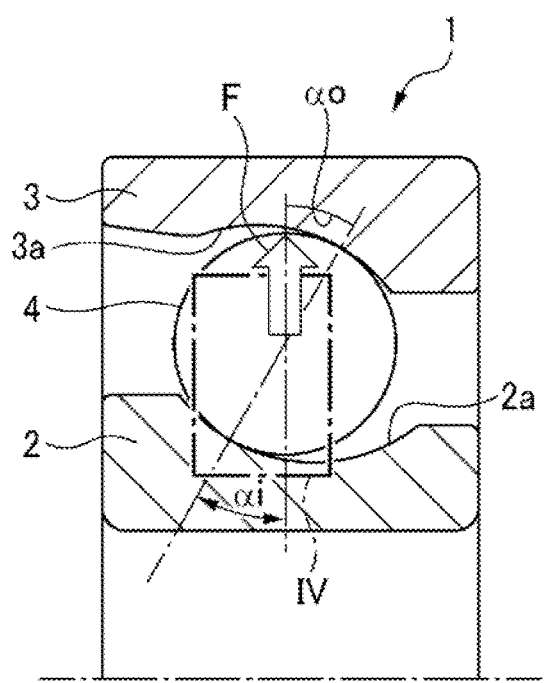
Figure 4B:
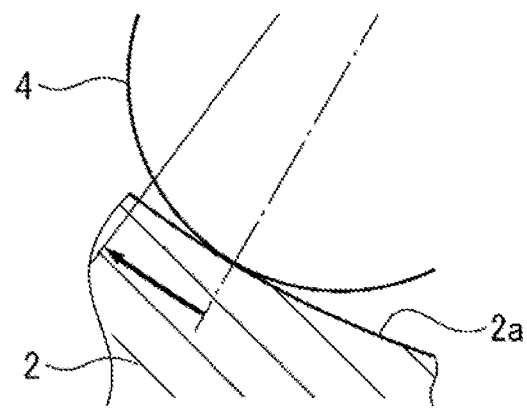
Figure 4C:
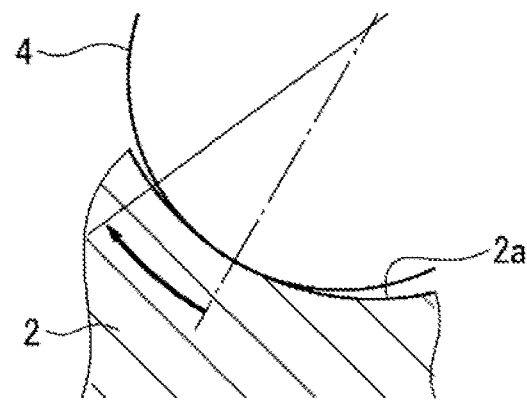

As shown in FIG. 4A, in the angular ball bearing 1 during operation, due to the force balance of a centrifugal force F acting on the ball 4 and the pre-load from the inner ring 2 or the outer ring 3, the contact angle αo of the ball 4 with the outer ring raceway groove 3a of the outer ring 3 decreases and the contact angle αi of the ball 4 with the inner ring raceway groove 2a of the inner ring 2 increases. In the inner ring 2, when the contact angle αi between the inner ring raceway groove 2a and the ball 4 increases, the spin slip amount increases and the heat generation amount increases. Therefore, by increasing Ri in the inner ring 2, the contact angle αi is less likely to be increased during the high speed rotation, and the contact ellipse length can be reduced. Therefore, the heat generation due to the spin slip can be reduced. That is, as shown in FIG. 4B, when Ri is increased, the change in the contact angle due to the centrifugal force decreases, and the spin slip amount also decreases. On the other hand, as shown in FIG. 4C, when Ri is reduced, the change in the contact angle due to the centrifugal force F increases, and the spin slip amount also increases. Therefore, it is considered that it is preferable to increase Ri in order to reduce the spin slip amount.

On the other hand, in the outer ring 3, when the outer ring groove curvature radius ratio Ro increases, the long radius of the contact ellipse decreases, which has the effect of reducing the heat generation. However, since the centrifugal force does not act in the direction in which the contact angle αo decreases, the increasing of the outer ring groove curvature radius ratio Ro is less effective than the increasing of the inner ring groove curvature radius ratio Ri for the purpose of reducing the heat generation amount due to the spin slip.

Here, the angular ball bearing of the following analysis condition 1 was used to change the inner ring groove curvature radius ratio Ri and the outer ring groove curvature radius ratio Ro, and the total spin heat generation amount of the inner ring side and the outer ring side was calculated. The calculation result of a total spin heat generation amount (W) corresponding to Ri and Ro is shown in Table 1.

(Analysis Condition 1)

Bearing inner diameter: 70 mm

Bearing outer diameter: 110 mm

Bearing width: 20 mm

Initial contact angle: 18°

Ball diameter/cross-sectional height ratio: 0.595

Rotation speed: 20,000 $\text{min}^{-1}$

Pre-load: 1,000 N

TABLE 1

| Inner ring groove curvature Ri (%) | Outer ring groove curvature Ro (%) | | | | | | | | | | | | | |
|---|---|---|---|---|---|---|---|---|---|---|---|---|---|---|
|  | 50.25 | 50.5 | 51 | 51.5 | 51.75 | 52 | 53 | 54 | 55 | 56 | 57 | 58 | 59 | 60 |
| 50.25 |  |  |  |  |  | 71.4 | 83.1 |  |  |  |  |  |  |  |
| 50.5 |  |  |  |  | 61.6 | 64.1 | 75.0 | 79.8 |  |  |  |  |  |  |
| 51 |  |  |  | 48.1 | 50.5 | 52.3 | 60.5 | 66.9 | 70.5 | 72.2 |  |  |  |  |
| 51.5 |  |  | 43.0 | 44.4 | 45.2 | 46.9 | 52.1 | 56.4 | 59.9 | 62.6 | 64.4 |  |  |  |
| 51.75 |  | 51.4 | 41.4 | 42.5 | 43.7 | 44.5 | 49.3 | 53.2 | 56.4 | 58.5 | 60.2 |  |  |  |
| 52 | 58.2 | 49.2 | 40.8 | 41.4 | 41.8 | 43.0 | 46.7 | 50.1 | 53.0 | 55.0 | 57.0 |  |  |  |
| 53 | 52.1 | 45.0 | 37.5 | 37.1 | 37.5 | 37.7 | 40.1 | 42.3 | 44.1 | 46.0 | 47.3 | 48.4 |  |  |
| 54 | 49.1 | 42.8 | 35.2 | 34.4 | 34.5 | 34.4 | 35.8 | 37.4 | 38.7 | 40.1 | 41.2 | 42.2 | 43.1 |  |
| 55 | 47.5 | 41.4 | 33.7 | 32.4 | 32.3 | 32.1 | 32.9 | 34.0 | 35.0 | 36.2 | 37.1 | 37.9 | 38.7 | 39.4 |
| 56 | 46.4 | 40.4 | 32.4 | 30.9 | 30.4 | 30.4 | 30.8 | 31.6 | 32.3 | 33.2 | 34.0 | 34.7 | 35.4 | 36.0 |
| 57 | 44.5 | 38.8 | 31.1 | 29.5 | 29.2 | 28.8 | 29.0 | 29.5 | 30.3 | 31.0 | 31.6 | 32.2 | 32.8 | 33.4 |
| 58 | 44.1 | 38.3 | 30.3 | 28.6 | 27.9 | 27.8 | 27.7 | 28.1 | 28.6 | 29.1 | 29.8 | 30.3 | 30.8 | 31.3 |
| 59 | 42.9 | 37.3 | 29.4 | 27.6 | 27.2 | 26.8 | 26.6 | 27.0 | 27.3 | 27.8 | 28.3 | 28.8 | 29.2 | 29.6 |
| 60 | 41.7 | 37.0 | 28.9 | 26.7 | 26.3 | 26.1 | 25.7 | 25.8 | 26.2 | 26.6 | 27.0 | 27.4 | 27.8 | 28.2 |

Figure 5:
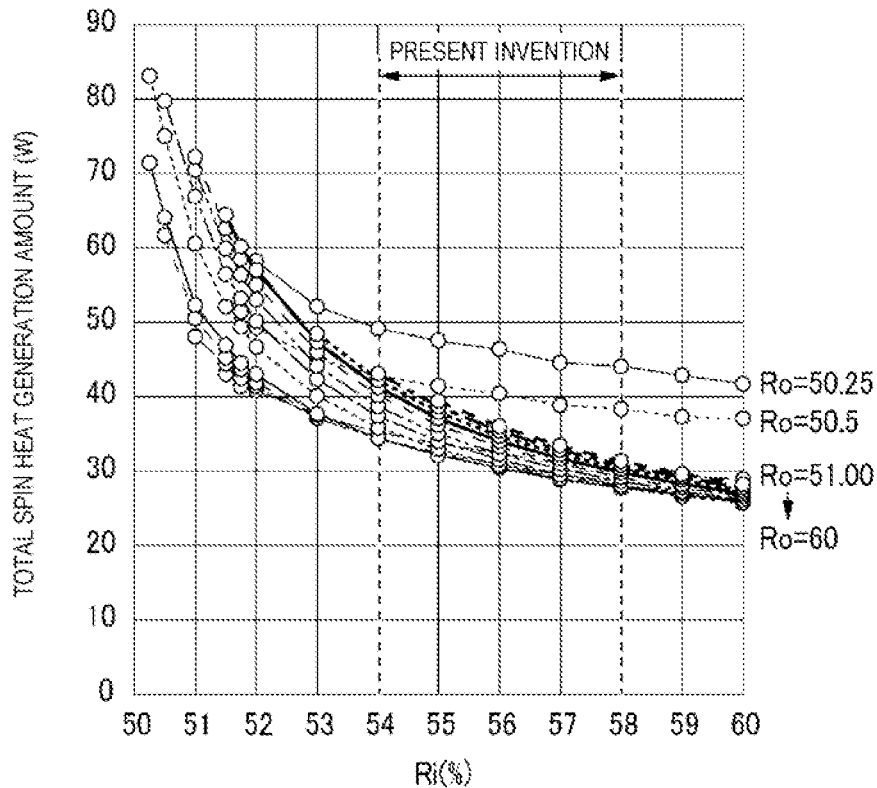
FIG. 5 is a graph in which the relationship between an inner ring groove curvature radius ratio (Ri) and the total spin heat generation amount of the inner ring side and the outer ring side is obtained by calculation in an analysis condition 1.
Figure 6:
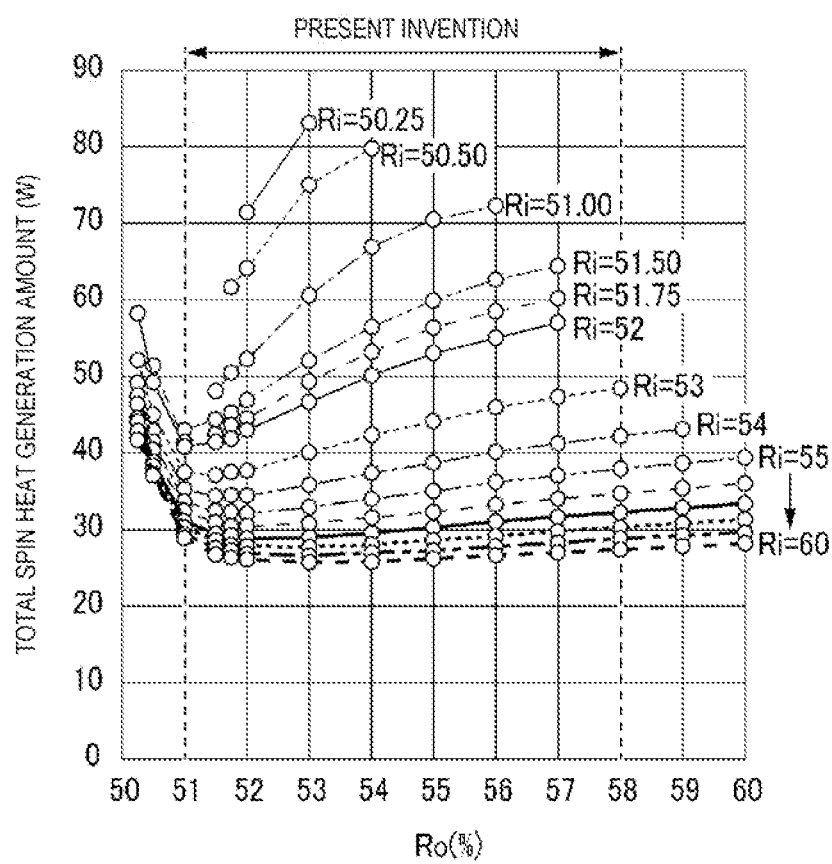
FIG. 6 is a graph in which the relationship between an outer ring groove curvature radius ratio (Ro) and the total spin heat generation amount of the inner ring side and the outer ring side is obtained by calculation in the analysis condition 1.

FIG. 5 is a graph showing the relationship between the inner ring groove curvature radius ratio Ri and the total spin heat generation amount with the outer ring groove curvature radius ratio Ri as the horizontal axis, and FIG. 6 is a graph showing the relationship between the outer ring groove curvature radius ratio Ro and the total spin heat generation amount with the outer ring groove curvature radius ratio Ro as the horizontal axis. First, it can be seen from the graph of FIG. 5 that the heat generation amount is reduced by increasing the inner ring groove curvature radius ratio Ri regardless of the outer ring groove curvature radius ratio Ro, and that the heat generation amount is extremely large when the inner ring groove curvature radius ratio Ri is less than 54%. However, if the inner ring groove curvature radius ratio Ri is excessively increased, the surface pressure between the inner ring raceway groove 2a and the ball 4 becomes high when the load is applied, and the indentation tends to be generated. In particular, when the inner ring groove curvature radius ratio Ri is larger than 58%, even if the indentation resistance is improved by surface curing, the indentation resistance is lower than that of the related-art product. In order to increase the degree of surface curing, it is necessary to make the machining conditions stricter. However, since the productivity is lowered accordingly, the machining conditions are limited. Therefore, the inner ring groove curvature radius ratio Ri is set to 54% to 58%.

On the other hand, based on the graph of FIG. 6, when the outer ring groove curvature radius ratio Ro is less than 51%, the heat generation amount is extremely large, and the minimum value is taken around 52%. When the outer ring groove curvature radius ratio Ro is equal to or larger than 52%, the increase in the heat generation amount due to the increase in Ro is relatively gentle. In consideration of the variation in the final quality of Ro during manufacturing, the variation in the heat generation amount due to the variation in the final quality of Ri during manufacturing can be controlled to be small if a region slightly larger than the minimum value of 52% is targeted. When the outer ring groove curvature radius ratio Ro is 58%, a value substantially equal to 51% is taken. Therefore, from the viewpoint of the effect of reducing the spin heat generation amount, the outer ring groove curvature radius ratio Ro is set to 51% to 58% including the minimum value of the heat generation amount.

[In Inner Ring Raceway Surface, Maximum Surface Pressure is 4.7 GPa to 6.0 GPa when Sum of Permanent Deformation Amounts of Ball and Inner Ring Raceway Groove at Center of Contact Portion Between Ball and Inner Ring Raceway Groove is 1/10,000 of Ball Diameter]

As described above, by setting the inner ring groove curvature radius ratio Ri to 54% to 58% and the outer ring groove curvature radius ratio Ro to 51% to 58%, it is possible to reduce the spin heat generation amount during the rotation. However, it is considered that the contact surface pressure increases when the external impact load is applied in the stationary state, and the chance of the generation of the indentation increases. Therefore, it is possible to further prevent the generation of the indentation by forming the cured surface layer 10 to which the surface residual stress is applied at least to the inner ring raceway groove 2a of the inner ring 2.

In order to form the cured surface layer 10, the roller burnishing processing is applied to the raceway groove. In the roller burnishing processing, the hydraulically held ceramic or cemented carbide ball (the indenter) is pressed against the inner ring raceway groove 2a and is moved along the axial cross section of the inner ring raceway groove 2a while being in rolling contact with the inner ring raceway groove 2a. The surface is cured by this roller burnishing processing. However, at this time, the machining conditions such as the indenter diameter and the pressing force of the burnishing tool are selected such that the maximum surface pressure is 4.7 GPa to 6.0 GPa when the sum of the permanent deformation amounts of the ball 4 and the inner ring raceway groove 2a at the center of the contact portion between the ball 4 and the inner ring raceway groove 2a is 1/10,000 of the ball diameter.

As the limit that does not hinder the smooth rotation of the bearing, the sum of the permanent deformation amount of the ball 4 and the permanent deformation amount of the raceway at the center of the contact portion between the ball 4 and the raceway is set to 1/10,000 of the ball diameter.

In the case of the ball bearing in which the residual compressive stress is not applied to the surface layer of the raceway surface, the maximum surface pressure is 4.2 GPa when the sum of the permanent deformation amounts of the ball and the raceway groove at the center of the contact portion between the ball and the raceway groove is 1/10,000 of the ball diameter (JIS B1519 compliant). Therefore, by applying the residual compressive stress, it is possible to attain the effect that the indentation is less likely to be generated due to the external impact load in the stationary state.

According to the investigation by the applicant, it is known that the surface pressure of approximately 4 GPa or more is applied to the bearing returned from the market as being hit-damaged. In the case in which the residual compressive stress is applied to the surface layer of the raceway surface and the maximum surface pressure is 4.7 GPa when the sum of the permanent deformation amounts of the ball 4 and the inner ring raceway groove 2a is 1/10,000 of the ball diameter, the defective product due to the indentation generated at the surface pressure of approximately 4 GPa or more and less than 4.7 GPa is no longer recognized as defective. Accordingly, the trouble of replacing the bearing is eliminated.

Further, in the inner ring raceway groove 2a, in consideration of the machining conditions that do not lower the productivity, the maximum surface pressure is set to 4.7 GPa to 6.0 GPa when the sum of the permanent deformation amounts of the ball 4 and the inner ring raceway groove 2a is 1/10,000 of the ball diameter.

The cured surface layer is not limited to being applied to the inner ring raceway groove 2a of the inner ring 2, and may be applied to the outer ring raceway groove 3a of the outer ring 3.

The technique for forming a hard film having the thickness of 0.05 μm to 8 μm on the raceway surface disclosed in Patent Literature 1 is a technique in which the cured layer is coated on the bearing ring after machining by a chemical treatment to improve the wear resistance and reduce the friction coefficient. On the other hand, for the surface-machined layer 10 according to the present embodiment, the surface is cured by machining, and the indentation resistance is improved.

[Ri–Ro≥0 Points]

The inner ring groove curvature radius ratio Ri and the outer ring groove curvature radius ratio Ro are set within the above-described ranges. However, by setting Ri to be equal to or larger than the outer ring groove curvature radius ratio Ro, the increase in the surface pressure of the outer ring 3 when the load is applied is controlled to be lower than that of the inner ring 2. On the other hand, the cured surface layer 10 is formed in the inner ring raceway groove 2a. Therefore, if it is possible to prevent the damage to the bearing due to the generation of the indentation in the outer ring 3 before the inner ring 2 when the external impact load is applied in the stationary state, the maximum surface pressure is set within the above-described range when the sum of the permanent deformation amounts of the ball 4 and the inner ring raceway groove 2a is 1/10,000 of the ball diameter in the inner ring raceway groove 2a. Accordingly, the effect of improving the indentation resistance can be sufficiently attained.

Figure 7:
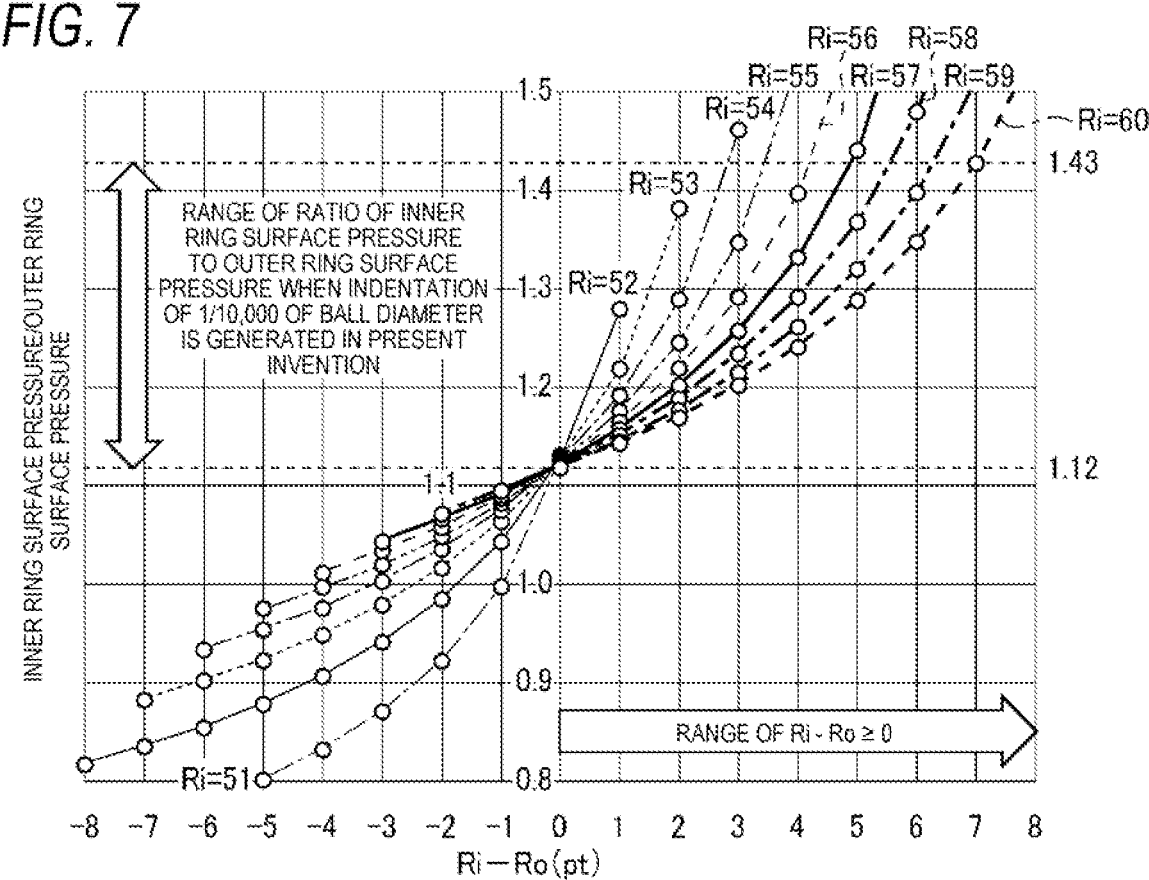
FIG. 7 is a graph in which the relationship between Ri–Ro and the ratio of an inner ring surface pressure and an outer ring surface pressure is obtained based on a calculated value in the analysis condition 1.

FIG. 7 is a graph in which the relationship between Ri–Ro and the ratio of the inner ring surface pressure and the outer ring surface pressure is obtained based on the calculated value in the bearing specifications of the analysis condition 1, and shows the magnitude relationship between the outer ring surface pressure and the inner ring surface pressure in the difference between Ri and Ro when the load is applied to the bearing. That is, the region where inner ring surface pressure/outer ring surface pressure >1 indicates that the inner ring surface pressure is high. The region where inner ring surface pressure/outer ring surface pressure <1 indicates that the outer ring surface pressure is high. The case in which inner ring surface pressure/outer ring surface pressure=1 indicates that the inner ring surface pressure is equal to the outer ring surface pressure. For example, in consideration of the general bearing in which the surface curing processing is not performed on the inner ring raceway groove 2a and the outer ring raceway groove 3a, the maximum surface pressure defined in JIS B1519 is 4.2 GPa for both the inner ring raceway surface and the outer ring raceway surface when the sum of the permanent deformation amounts of the ball and the raceway groove at the center of the contact portion between the ball and the raceway groove is 1/10,000 of the ball diameter. Therefore, the region where inner ring surface pressure/outer ring surface pressure >1 means that the indentation is generated first on the inner ring raceway surface, the region where inner ring surface pressure/outer ring surface pressure <1 means that the indentation is generated first on the outer ring raceway surface. The region where inner ring surface pressure/outer ring surface pressure=1 means that the indentation is generated simultaneously on the inner ring raceway surface and the outer ring raceway surface.

When the surface curing processing is performed on the inner ring raceway groove 2a of the inner ring 2 to form the cured surface layer 10, the maximum surface pressure is set to 4.7 GPa to 6.0 GPa when the sum of the permanent deformation amounts of the ball 4 and the inner ring raceway groove 2a is 1/10,000 of the ball diameter, and the surface curing processing is not performed on the outer ring raceway groove of the outer ring, the ratio of the inner ring surface pressure to the outer ring surface pressure, in which the indentation is generated on the inner ring raceway surface before the outer ring raceway surface, is in the region of 1.120≤inner ring surface pressure/outer ring surface pressure ≤1.429 shown in FIG. 7. Since the lower limit value 1.120 and the upper limit value 1.429 of the ratio of the inner ring surface pressure to the outer ring surface pressure, in which the indentation is generated on the inner ring raceway surface before the outer ring raceway surface, are the ratio of the surface pressure between the inner ring raceway surface subjected to the surface curing processing and the outer ring raceway surface not subjected to the surface curing processing, the lower limit value and the upper limit value are obtained as 4.7÷4.2=1.120 and 6.0÷4.2=1.429, respectively.

From the results shown in FIG. 7, in the bearing in which the surface curing processing is performed on the raceway groove of the inner ring, when Ri–Ro≥0 points, inner ring surface pressure/outer ring surface pressure ≥1.120. Therefore, the indentations are not generated on the outer ring first, and the effect of the surface curing on the inner ring can be sufficiently attained. It can be seen that even if the surface curing processing is not performed on the outer ring raceway groove 3a of the outer ring 3, the indentation resistance equal to or greater than that of the inner ring 2 having the inner ring raceway groove 2a subjected to the surface curing processing can be attained. Therefore, in the present embodiment, the surface curing processing to the outer ring raceway groove 3a is not required, and the manufacturing advantage can be attained.

From the results shown in FIG. 7, in the range where Ri is 54% to 58% and Ro is 51% to 58%, the range of inner ring surface pressure/outer ring surface pressure at the Ri–Ro=0 points is 1.120≤inner ring surface pressure/outer ring surface pressure ≤1.124, and the range of inner ring surface pressure/outer ring surface pressure at the Ri–Ro=1 point is 1.151≤inner ring surface pressure/outer ring surface pressure ≤1.191. That is, since the value of inner ring surface pressure/outer ring surface pressure at Ri–Ro=1 point is larger than the Ri–Ro=0 points and the range is wide, the condition is attained in which the inner ring surface pressure tends to be higher than the outer ring surface pressure, the indentation is likely to be generated in the inner ring first, and the indentation is less likely to be generated in the outer ring. Therefore, the effect of the surface strengthening processing is more easily attained. Therefore, it is desirable that Ri−Ro≥1 point.

[Relationship with Ball Diameter/Cross-sectional Height Ratio]

In the analysis condition 1, it was confirmed that the total spin heat generation amount can be reduced by setting the inner ring groove curvature radius ratio Ri to 54% to 58% and the outer ring groove curvature radius ratio Ro to 51% to 58% when the ball diameter/cross-sectional height ratio is 0.595 using the ball having the relatively large ball diameter (the large ball). In the following, in an analysis condition 2, it was checked whether the total spin heat generation amount can be reduced according to the above-described definitions of Ri and Ro when the ball diameter/cross-sectional height ratio is 0.437 using the ball having the smaller ball diameter (the small ball) than the above. The calculation result of the total spin heat generation amount (W) corresponding to Ri and Ro is shown in Table 2.

Figure 8:
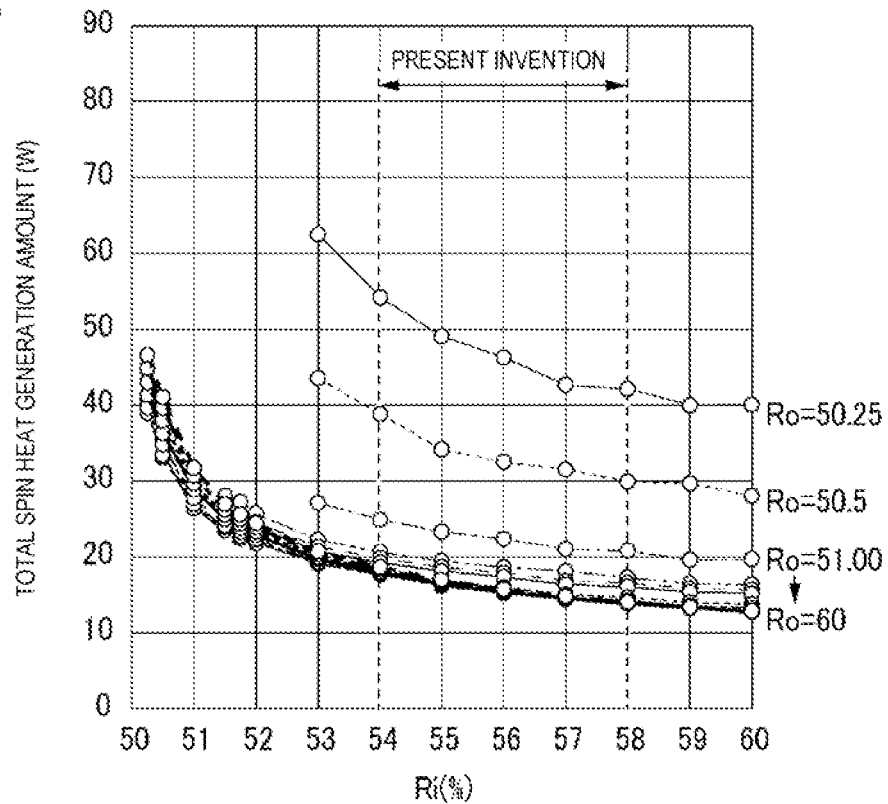
FIG. 8 is a graph in which the relationship between the inner ring groove curvature radius ratio (Ri) and the total spin heat generation amount of the inner ring side and the outer ring side is obtained by calculation in an analysis condition 2.
Figure 9:
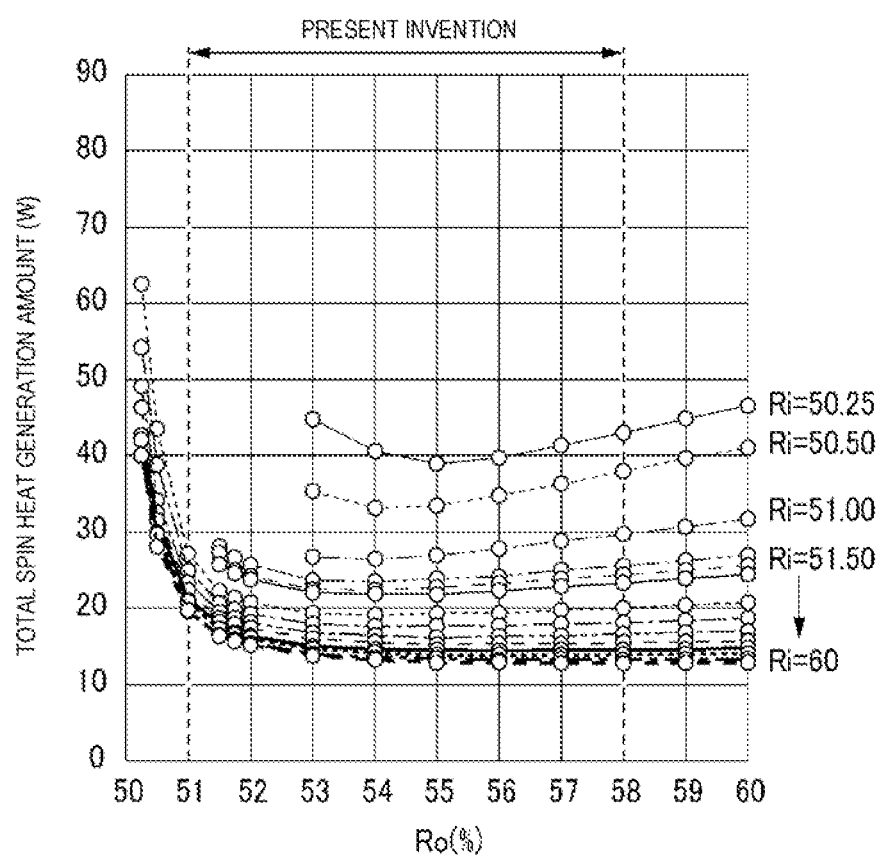
FIG. 9 is a graph in which the relationship between the outer ring groove curvature radius ratio (Ro) and the total spin heat generation amount of the inner ring side and the outer ring side is obtained by calculation in the analysis condition 2.

(Analysis Condition 2)
  Bearing inner diameter: 70 mm
  Bearing outer diameter: 110 mm
  Bearing width: 20 mm
  Contact angle: 18°
  Ball diameter/cross-sectional height ratio: 0.437
  Rotation speed: 20,000 min$^{-1}$
  Pre-load: 1,000 N FIG. 8 is a graph showing the relationship between the inner ring groove curvature radius ratio Ri and the total spin heat generation amount with the outer ring groove curvature radius ratio Ri as the horizontal axis, and FIG. 9 is a graph showing the relationship between the outer ring groove curvature radius ratio Ro and the total spin heat generation amount on the inner ring side and the outer ring side with the outer ring groove curvature radius ratio Ro as the horizontal axis. In this case, similar to the analysis condition 1, the effect of reducing the total spin heat generation amount on the inner ring side and the outer ring side is recognized in the range where the inner ring groove curvature radius ratio Ri is 54% to 58% and the outer ring groove curvature radius ratio Ro is 51% to 58%.

Next, for an analysis condition 3 having the ball diameter/cross-sectional height ratio of 0.572 and an analysis condition 4 having the ball diameter/cross-sectional height ratio of 0.635, in which the bearing size is different from that in the analysis condition 1 and the relatively large ball diameter similar to the analysis condition 1 (the large ball) is used, it was checked whether the total spin heat generation amount can be reduced according to the above-described definitions of Ri and Ro. In the analysis condition 3, the calculation result of the total spin heat generation amount (W) corresponding to Ri and Ro is shown in Table 3, and in the analysis condition 4, the calculation result of the total spin heat generation amount (W) corresponding to Ri and Ro is shown in Table 4.

(Analysis Condition 3)
  Bearing inner diameter: 30 mm
  Bearing outer diameter: 55 mm
  Bearing width: 13 mm
  Contact angle: 18°
  Ball diameter/cross-sectional height ratio: 0.572
  Rotation speed: 43,000 min$^{-1}$
  Pre-load: 440 N

TABLE 2

| | | Outer ring groove curvature Ro (%) | | | | | | | | | | | | | |
|---|---|---|---|---|---|---|---|---|---|---|---|---|---|---|---|
| | | 50.25 | 50.5 | 51 | 51.5 | 51.75 | 52 | 53 | 54 | 55 | 56 | 57 | 58 | 59 | 60 |
| Inner ring groove curvature Ro (%) | 50.25 | | | | | | | 44.8 | 40.6 | 39.0 | 39.7 | 41.4 | 43.0 | 44.9 | 46.6 |
| | 50.5 | | | | | | | 35.3 | 33.1 | 33.4 | 34.8 | 36.3 | 38.0 | 39.7 | 41.1 |
| | 51 | | | | | | | 26.7 | 26.4 | 26.9 | 27.8 | 28.9 | 29.7 | 30.7 | 31.7 |
| | 51.5 | | | | 28.1 | 26.6 | 25.7 | 23.7 | 23.5 | 23.9 | 24.2 | 25.0 | 25.6 | 26.3 | 27.0 |
| | 51.75 | | | | 27.3 | 25.0 | 24.2 | 22.5 | 22.4 | 22.8 | 23.3 | 23.9 | 24.4 | 25.0 | 25.6 |
| | 52 | | | | 25.7 | 24.6 | 23.8 | 22.1 | 21.9 | 21.8 | 22.3 | 22.9 | 23.3 | 23.9 | 24.4 |
| | 53 | 62.5 | 43.6 | 27.1 | 22.3 | 21.3 | 20.7 | 19.4 | 19.1 | 19.3 | 19.4 | 19.8 | 20.1 | 20.4 | 20.8 |
| | 54 | 54.2 | 38.8 | 24.9 | 20.6 | 19.9 | 19.3 | 17.9 | 17.7 | 17.7 | 17.7 | 18.0 | 18.1 | 18.4 | 18.7 |
| | 55 | 49.1 | 34.2 | 23.4 | 19.5 | 18.7 | 18.2 | 16.8 | 16.5 | 16.2 | 16.3 | 16.4 | 16.6 | 16.9 | 17.0 |
| | 56 | 46.3 | 32.5 | 22.4 | 18.7 | 17.9 | 17.4 | 16.0 | 15.6 | 15.3 | 15.4 | 15.4 | 15.5 | 15.6 | 15.7 |
| | 57 | 42.7 | 31.6 | 21.0 | 18.2 | 16.9 | 16.4 | 15.0 | 14.6 | 14.6 | 14.4 | 14.6 | 14.6 | 14.6 | 14.8 |
| | 58 | 42.1 | 29.9 | 20.8 | 17.3 | 16.6 | 16.1 | 14.7 | 14.2 | 13.9 | 13.9 | 13.9 | 14.0 | 14.0 | 14.1 |
| | 59 | 40.0 | 29.7 | 19.6 | 16.5 | 15.9 | 15.4 | 14.0 | 13.6 | 13.4 | 13.2 | 13.4 | 13.3 | 13.3 | 13.4 |
| | 60 | 40.1 | 28.1 | 19.8 | 16.4 | 15.7 | 15.2 | 13.8 | 13.3 | 12.9 | 12.9 | 12.8 | 12.7 | 12.9 | 12.9 |

TABLE 3

| | | Outer ring groove curvature Ro (%) | | | | | | | | | | | | | |
|---|---|---|---|---|---|---|---|---|---|---|---|---|---|---|---|
| | | 50.25 | 50.5 | 51 | 51.5 | 51.75 | 52 | 53 | 54 | 55 | 56 | 57 | 58 | 59 | 60 |
| Inner ring groove curvature Ro (%) | 50.25 | | | | 42.2 | 43.4 | 44.5 | 48.6 | 51.1 | 52.5 | 53.3 | 53.7 | | | |
| | 50.5 | | | 33.2 | 34.6 | 35.2 | 35.9 | 39.1 | 41.1 | 43.8 | 45.4 | 46.7 | 47.8 | | |
| | 51 | | 29.6 | 27.0 | 27.3 | 27.4 | 27.8 | 29.4 | 31.0 | 32.4 | 33.7 | 34.7 | 35.4 | | |
| | 51.5 | 34.7 | 27.6 | 24.0 | 23.7 | 23.6 | 23.8 | 24.7 | 25.8 | 26.8 | 27.7 | 28.5 | 29.2 | 29.8 | |
| | 51.75 | 32.7 | 26.0 | 23.5 | 22.2 | 22.6 | 22.3 | 23.3 | 23.9 | 24.9 | 25.7 | 26.4 | 27.0 | 27.6 | 28.2 |
| | 52 | 31.9 | 26.9 | 22.9 | 22.2 | 21.9 | 22.1 | 22.6 | 23.1 | 24.0 | 24.8 | 25.5 | 26.1 | 26.7 | 27.3 |
| | 53 | 29.9 | 23.0 | 20.0 | 19.0 | 18.6 | 18.7 | 18.7 | 19.2 | 19.5 | 20.1 | 20.4 | 20.9 | 21.4 | 21.7 |
| | 54 | 29.0 | 22.1 | 18.6 | 17.4 | 17.0 | 17.0 | 16.8 | 17.1 | 17.2 | 17.7 | 17.9 | 18.2 | 18.6 | 18.9 |
| | 55 | 27.2 | 21.5 | 17.1 | 16.4 | 15.9 | 15.9 | 15.5 | 15.7 | 15.7 | 15.9 | 16.2 | 16.4 | 16.7 | 17.0 |
| | 56 | 25.4 | 20.2 | 16.5 | 15.2 | 15.1 | 14.7 | 14.5 | 14.4 | 14.6 | 14.7 | 14.8 | 15.1 | 15.3 | 15.5 |

TABLE 3-continued

|   | Outer ring groove curvature Ro (%) | | | | | | | | | | | | | |
|---|---|---|---|---|---|---|---|---|---|---|---|---|---|---|
|   | 50.25 | 50.5 | 51 | 51.5 | 51.75 | 52 | 53 | 54 | 55 | 56 | 57 | 58 | 59 | 60 |
| 57 | 25.9 | 19.2 | 15.6 | 14.7 | 14.2 | 14.2 | 13.6 | 13.6 | 13.6 | 13.8 | 13.9 | 14.0 | 14.3 | 14.4 |
| 58 | 24.9 | 19.2 | 15.4 | 14.0 | 13.8 | 13.4 | 13.0 | 12.8 | 13.0 | 13.0 | 13.0 | 13.3 | 13.4 | 13.5 |
| 59 | 23.8 | 18.5 | 14.7 | 13.3 | 13.1 | 13.1 | 12.4 | 12.4 | 12.3 | 12.4 | 12.5 | 12.5 | 12.7 | 12.9 |
| 60 | 24.4 | 17.7 | 14.1 | 13.1 | 12.5 | 12.5 | 12.0 | 11.7 | 11.8 | 11.8 | 11.9 | 12.0 | 12.0 | 12.1 |

(Analysis Condition 4)
  Bearing inner diameter: 110 mm
  Bearing outer diameter: 170 mm
  Bearing width: 28 mm
  Contact angle: 18°
  Ball diameter/cross-sectional height ratio: 0.635
  Rotation speed: 13,000 $min^{-1}$
  Pre-load: 2,200 N

TABLE 4

| | | Outer ring groove curvature Ro (%) | | | | | | | | | | | | | |
|---|---|---|---|---|---|---|---|---|---|---|---|---|---|---|---|
| | | 50.25 | 50.5 | 51 | 51.5 | 51.75 | 52 | 53 | 54 | 55 | 56 | 57 | 58 | 59 | 60 |
| Inner | 50.25 | | | | | | 171.8 | 194.3 | | | | | | | |
| ring | 50.5 | | | | | 147.1 | 156.0 | 175.3 | 180.7 | | | | | | |
| groove | 51 | | | 109.6 | 117.9 | 124.4 | 129.7 | 146.9 | 156.2 | 159.1 | | | | | |
| curvature | 51.5 | | | 103.8 | 108.5 | 112.8 | 116.3 | 128.9 | 137.3 | 143.2 | | | | | |
| Ro | 51.75 | | 116.5 | 101.3 | 104.7 | 107.1 | 111.0 | 120.6 | 129.1 | 134.5 | 139.0 | | | | |
| (%) | 52 | 148.4 | 114.5 | 99.2 | 101.5 | 103.4 | 105.7 | 114.8 | 121.5 | 127.2 | 130.7 | | | | |
| | 53 | 136.8 | 107.0 | 91.7 | 91.6 | 92.2 | 93.3 | 98.6 | 103.0 | 107.2 | 110.4 | 112.7 | | | |
| | 54 | 130.6 | 102.8 | 86.8 | 85.3 | 85.2 | 85.6 | 88.7 | 91.7 | 94.8 | 97.3 | 99.6 | 101.3 | | |
| | 55 | 127.5 | 98.7 | 82.5 | 80.3 | 79.8 | 79.7 | 81.5 | 84.1 | 86.4 | 88.3 | 90.2 | 91.6 | 93.0 | |
| | 56 | 123.6 | 95.6 | 79.2 | 76.4 | 75.7 | 75.4 | 76.3 | 78.1 | 79.8 | 81.4 | 82.9 | 84.4 | 85.6 | |
| | 57 | 120.8 | 93.3 | 76.6 | 73.5 | 72.5 | 72.0 | 72.7 | 73.5 | 74.8 | 76.4 | 77.6 | 78.9 | 79.9 | 80.8 |
| | 58 | 118.7 | 91.5 | 74.5 | 71.0 | 70.0 | 69.4 | 69.0 | 69.8 | 71.2 | 72.1 | 73.1 | 74.2 | 75.3 | 76.1 |
| | 59 | 117.2 | 90.0 | 72.7 | 68.6 | 67.9 | 67.1 | 66.4 | 66.9 | 67.9 | 68.6 | 69.7 | 70.6 | 71.3 | 72.3 |
| | 60 | 114.1 | 87.7 | 70.6 | 66.9 | 65.6 | 65.3 | 64.2 | 64.4 | 65.2 | 65.7 | 66.7 | 67.4 | 68.2 | 68.8 |

Figure 10:
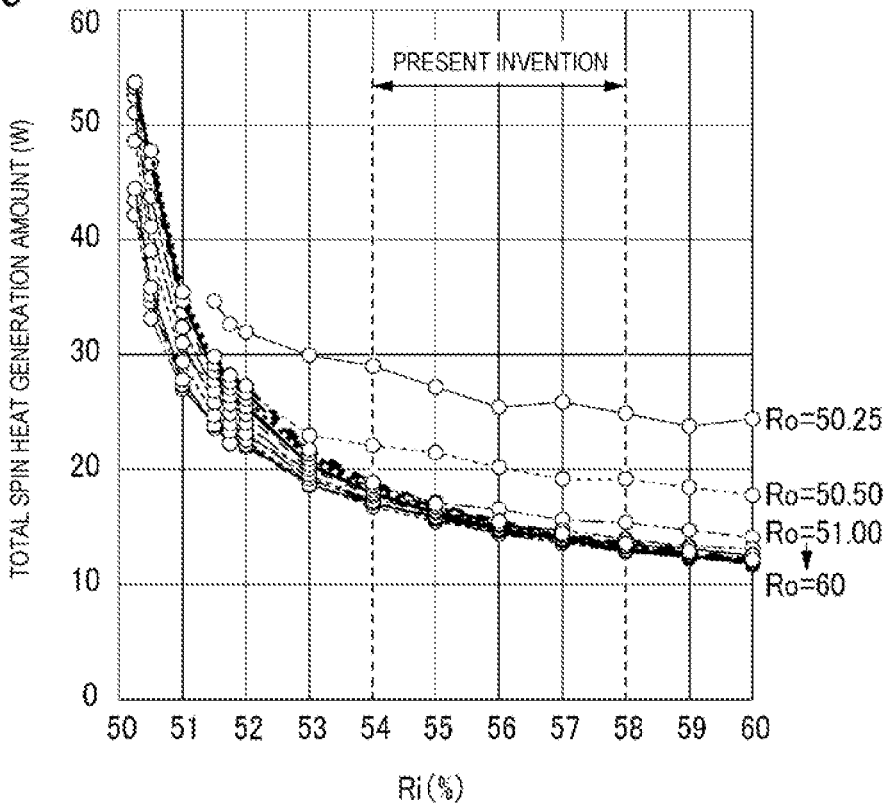
FIG. 10 is a graph in which the relationship between the inner ring groove curvature radius ratio (Ri) and the total spin heat generation amount of the inner ring side and the outer ring side is obtained by calculation in an analysis condition 3.
Figure 11:
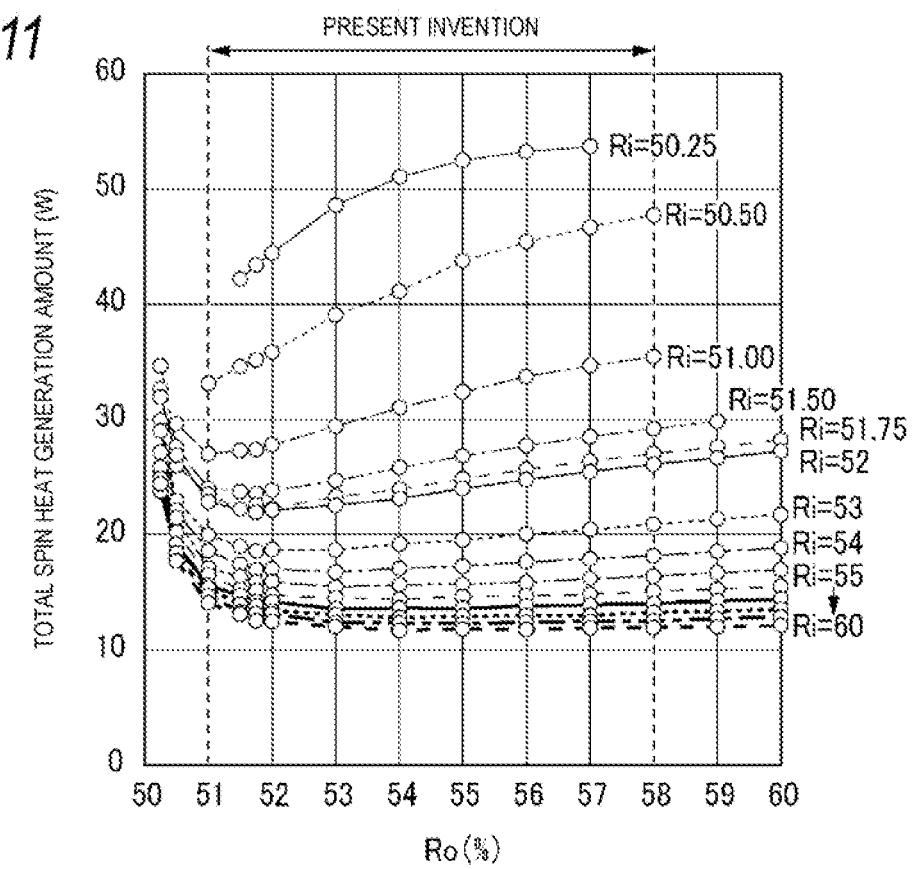
FIG. 11 is a graph in which the relationship between the outer ring groove curvature radius ratio (Ro) and the total spin heat generation amount of the inner ring side and the outer ring side is obtained by calculation in the analysis condition 3.

FIG. 10 is a graph showing the relationship between the inner ring groove curvature radius ratio Ri and the total spin heat generation amount with the outer ring groove curvature radius ratio Ri as the horizontal axis in the analysis condition 3, and FIG. 11 is a graph showing the relationship between the outer ring groove curvature radius ratio Ro and the total spin heat generation amount with the outer ring groove curvature radius ratio Ro as the horizontal axis in the analysis condition 3.

Figure 12:
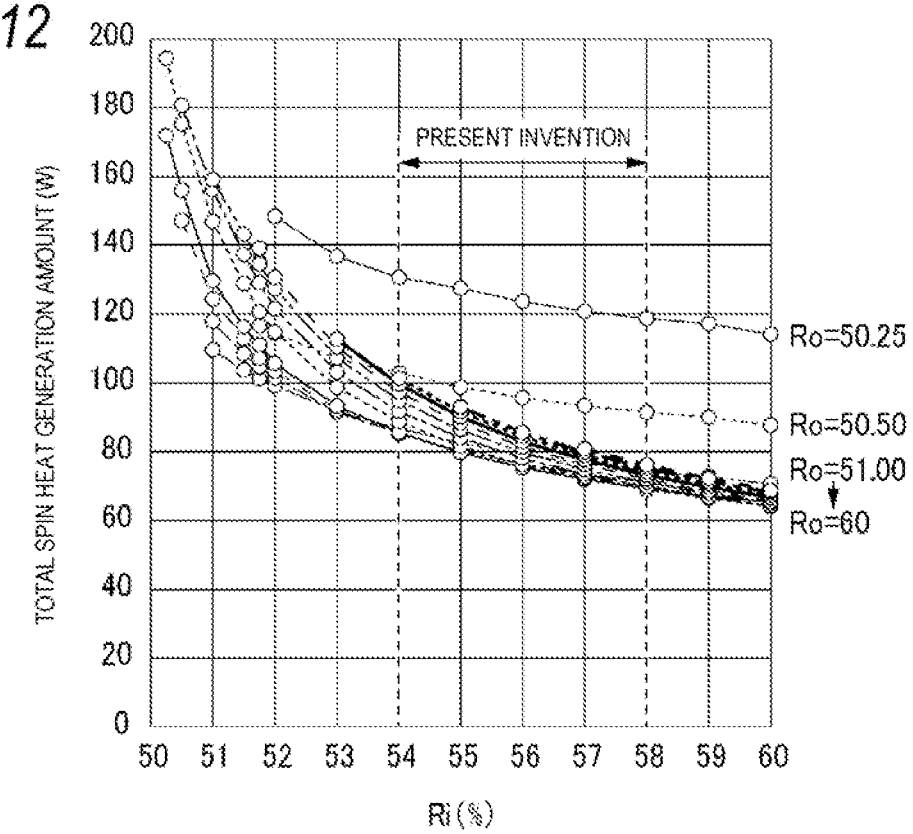
FIG. 12 is a graph in which the relationship between the inner ring groove curvature radius ratio (Ri) and the total spin heat generation amount of the inner ring side and the outer ring side is obtained by calculation in an analysis condition 4.
Figure 13:
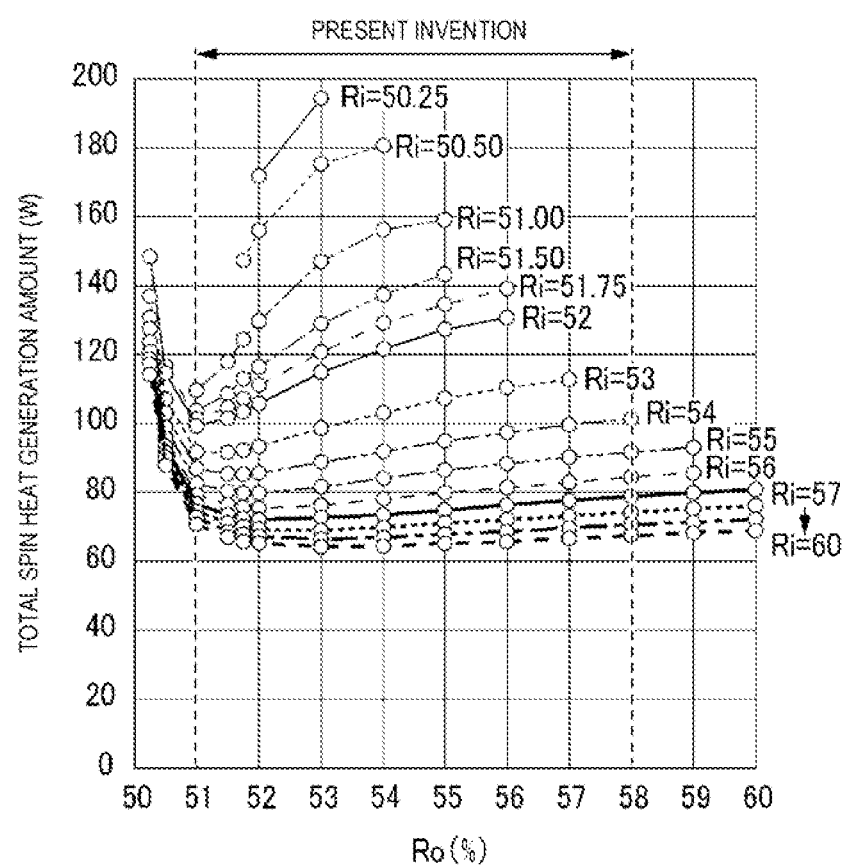
FIG. 13 is a graph in which the relationship between the outer ring groove curvature radius ratio (Ro) and the total spin heat generation amount of the inner ring side and the outer ring side is obtained by calculation in the analysis condition 4.

FIG. 12 is a graph showing the relationship between the inner ring groove curvature radius ratio Ri and the total spin heat generation amount with the outer ring groove curvature radius ratio Ri as the horizontal axis in the analysis condition 4, and FIG. 13 is a graph showing the relationship between the outer ring groove curvature radius ratio Ro and the total spin heat generation amount with the outer ring groove curvature radius ratio Ro as the horizontal axis in the analysis condition 4.

In the case of the analysis conditions 3 and 4, the effect of reducing the total spin heat generation amount on the inner ring side and the outer ring side is recognized in the range where the inner ring groove curvature radius ratio Ri is 54% to 58% and the outer ring groove curvature radius ratio Ro is 51% to 58%.

Therefore, it is understood that, by defining the inner ring groove curvature radius ratio Ri and the outer ring groove curvature radius ratio Ro, even when the bearing size is changed, the total spin heat generation amount can be reduced, and the effect of being capable of reducing the indentation resistance does not change.

On the other hand, the smaller the ball diameter/cross-sectional height ratio, the more advantageous it is in reducing the heat generation. However, if the ball diameter/cross-sectional height ratio is too small, the effective radial clearance becomes excessively small due to the influence of the centrifugal expansion and the thermal expansion of the inner ring when the operation is performed during the high speed rotation, which causes the seizure. Therefore, the ball diameter/cross-sectional height ratio needs to be 0.39 or more. On the other hand, the larger the ball diameter/cross-sectional height ratio, the more advantageous it is for the indentation resistance. However, if this value is larger than 0.65, the thickness of the bearing ring becomes too small, resulting in a disadvantage in manufacturing such as the large heat treatment deformation and the large machining deformation, which is not preferable. Therefore, it is preferable that the ratio value of ball diameter/cross-sectional height is 0.39 to 0.65, and it is more preferable to use the large ball having the ratio value of ball diameter/cross-sectional height of 0.55 to 0.65 when the indentation resistance is emphasized.

The inner ring 2 and the outer ring 3 are typically formed of the bearing steel such as high carbon chromium bearing steel (SUJ2). The bearing steel such as SUJ2 is used at the relatively low temperature because the hardness drops remarkably and the service life is shortened at the high temperature. Therefore, when the rotation is required at the higher speed, the contact pressure on the contact surface where the ball 4 and the inner ring 2 and the outer ring 3 are in contact with each other and the slippage of the ball 4 are increased, heat is generated, and the temperature becomes locally high. Therefore, it is desirable that the inner ring 2 and the outer ring 3 are formed of a material having excellent heat resistance and wear resistance.

Therefore, the material in which the secondary curing precipitated eutectic carbide is formed, for example, high-speed steel, semi-high-speed steel, or martensitic stainless steel is preferable, and the examples thereof include SKD, SKH, M50, and SUS440C. The general bearing steel (SUJ2) whose tempering temperature is raised to 240° C. to 330° C. may be used and hard-coated. In this case, although the hardness of the base material itself decreases, since the hardness of the raceway ring surface can be increased by applying the hard coating, the same performance as in the case of using the above-described metal material can be attained.

The material (the material similar to high carbon chromium steel) whose tempering resistance is improved by the constituent element component and whose dimension is stabilized is preferable, and the examples thereof include the SHX material. In this case, at least one of the inner ring 2 and the outer ring 3 is formed of the steel material containing 0.2% by mass to 1.2% by mass of C, 0.7% by mass to 1.5% by mass of Si, 0.5% by mass to 1.5% by mass of Mo, 0.5% by mass to 2.0% by mass of Cr, the balance Fe, and unavoidable impurity elements. By quenching and tempering after carbonitriding, the surface carbon concentration is 0.8% by mass to 1.3% by mass and the surface nitrogen concentration is 0.2% by mass to 0.8% by mass. Here, the critical significance of the effective range of each of the above-described constituent elements will be described.

(1) Si: 0.7% by Mass to 1.5% by Mass

Si is an element effective in temper softening resistance, and has the effect of improving the high-temperature strength and retarding the decomposition of retained austenite, which is effective in preventing the indentation-induced flaking in the high temperature environment. When the Si content was less than 0.7% by mass, the high temperature strength was insufficient, and the indentation-induced flaking occurred. Therefore, the lower limit value of the Si content was set to 0.7% by mass. On the other hand, when the Si content was more than 1.5% by mass, the mechanical strength decreases, and carburization is inhibited. Therefore, the upper limit value of the Si content is set to 1.5% by mass.

(2) Mo: 0.5% by Mass to 1.5% by Mass

Mo is an element effective in tempering softening resistance similarly to Si, and has the effect of improving the high temperature strength. Mo acts as a carbide-forming element that forms minute carbides on the carbonitrided surface. When the Mo content was less than 0.5% by mass, the high temperature strength was insufficient, and the carbide precipitated on the surface was insufficient. Therefore, the lower limit value of the Mo content was set to 0.5% by mass. On the other hand, when the Mo content is more than 1.5% by mass, giant carbide is formed in the raw material stage, causing the carbide to fall out and reduce the rolling fatigue life of the bearing. Therefore, the upper limit value of the Mo content was set to 1.5% by mass.

(3) Cr: 0.5% by Mass to 2.0% by Mass

Cr is an additive element having the same function and effect as Mo. When the Cr content was less than 0.5% by mass, the high temperature strength was insufficient, and the amount of the carbide precipitated on the surface was insufficient. Therefore, the lower limit value of the Cr content was set to 0.5% by mass. On the other hand, when the Cr content is more than 2.0% by mass, giant carbide is formed in the raw material stage, causing the carbide to fall out and reduce the rolling fatigue life of the bearing. Therefore, the upper limit value of the Cr content was set to 2.0% by mass.

(4) C: 0.2% by Mass to 1.2% by Mass

As described above, if the amount of the retained austenite is too large, the retained austenite decomposes and changes in shape over time, and the dimensional stability of the bearing is impaired. On the other hand, the presence of the retained austenite in the bearing ring surface is effective in preventing the indentation-induced flaking. Therefore, it is preferable to limit the amount of the retained austenite in the entire bearing after the retained austenite is present on the surface. Therefore, it is necessary to reduce the amount of the retained austenite in the bearing core portion. From this point of view, it is preferable that the amount of the average retained austenite in the steel including the surface and the core portion is 5% by volume or less. Therefore, it is necessary to set the carbon concentration on which the retained austenite depends to 1.2% by mass or less, and thus the upper limit value of the carbon concentration was set to 1.2% by mass. On the other hand, when the carbon concentration is less than 0.2% by mass, it takes a long time to obtain the desired carburizing depth in the carbonitriding treatment, which leads to the increase in overall cost. Therefore, the lower limit value of the carbon concentration was set to 0.2% by mass.

(5) Surface Carbon Concentration: 0.8% by Mass to 1.3% by Mass

When carbon is added to the surface by the carbonitriding treatment, the martensite structure serving as the matrix can be subjected to the solid solution strengthening, and a large amount of retained austenite effective for preventing the indentation-induced flaking can be formed in the extreme surface layer portion. If the surface carbon concentration is less than 0.8% by mass, the surface hardness is insufficient, and the rolling fatigue life and the wear resistance are lowered. Therefore, the lower limit value of the surface carbon concentration is set to 0.8% by mass. On the other hand, if the surface carbon concentration is more than 1.3% by mass, giant carbide is precipitated during the carbonitriding treatment, and the rolling fatigue life is reduced. Therefore, the upper limit value of the surface carbon concentration is set to 1.3% by mass.

(6) Surface N Concentration: 0.2% by Mass to 0.8% by Mass

If nitrogen is added to the surface by the carbonitriding treatment, the tempering resistance is improved, the high temperature strength is increased, the wear resistance is improved, and a large amount of retained austenite effective for preventing the indentation-induced flaking can be presented in the extreme surface layer portion. If the surface nitrogen concentration is less than 0.2% by mass, the high temperature strength is lowered, and the wear resistance is lowered. Therefore, the lower limit value of the surface nitrogen concentration is set to 0.2% by mass. On the other hand, when the surface nitrogen concentration is more than 0.8% by mass, it becomes difficult to finish the grinding during the bearing manufacturing, and the difficulty of the grinding reduces the productivity of the bearing. Therefore, the upper limit value of the surface nitrogen concentration is set to 0.8% by mass.

(7) Other Constituent Elements

The balance is Fe and unavoidable impurities, and it is preferable to add a small amount of Ti as another constituent element. This is because, if Ti is added, fine titanium carbide (TiC) or carbonitride (Ti(C+N)) precipitates and disperses in the matrix, and the wear resistance and the seizure resistance are improved. In this case, the Ti content is desirably 0.1% by mass to 0.3% by mass. If the Ti content is less than 0.1% by mass, the effect of the precipitation of the carbide cannot be attained, and thus the lower limit value of the Ti content is set to 0.1% by mass. On the other hand, if the Ti content is more than 0.3% by mass, the huge precipitate is likely to be formed. Since the huge precipitate may become a defect and conversely reduce the rolling fatigue life, the upper limit value of the Ti content is set to 0.3% by mass. Incidentally, if the size of the titanium precipitate (TiC and Ti(C+N)) is 0.1 µm or less, it contributes to the improvement of the wear resistance and the seizure resistance.

It is desirable to avoid containing the unavoidable impurity elements such as S, P, H and O as much as possible. In particular, if the content of oxygen (O) exceeds 12 ppm, the oxide-based inclusions are likely to be formed, which may become a defect and reduce the rolling fatigue life. Therefore, the oxygen content is desirably less than 12 ppm.

Further, the ball 4 may be formed of steel excellent in heat resistance and wear resistance, and may also be formed of ceramics such as silicon nitride ($Si_3N_4$), silicon carbide (SiC), or aluminum oxide ($Al_2O_3$). In particular, since the ceramic ball 4 has a Young's modulus higher than that of the steel ball, the contact pressure between the ball 4 and the raceway groove is high and the indentation tends to be generated. Therefore, the angular ball bearing having the improved indentation resistance, as in the present embodiment, operates more effectively.

As described above, in the angular ball bearing according to the present embodiment, the groove curvature radius ratio (Ri) of the inner ring raceway groove 2a to the ball diameter is 54% to 58%, the groove curvature radius ratio (Ro) of the outer ring raceway groove 3a to the ball diameter is 51% to 58%, Ri−Ro≥0 points, and at least the inner ring raceway groove 2a has a maximum surface pressure of 4.7 GPa to 6.0 GPa when the sum of the permanent deformation amounts of the ball 4 and the inner ring raceway groove 2a at the center of the contact portion between the ball 4 and the inner ring raceway groove 2a is 1/10,000 of the ball diameter. Accordingly, since the heat generation is reduced and the indentation resistance is excellent, the angular ball bearing is suitable for the use in the application in which the angular ball bearing is used during the high speed rotation and the excessive load is applied in the stationary state, and is particularly useful as an angular ball bearing that is used for the machine tool spindle having the dmn of 800,000 or more and that is pre-loaded.

In the above-described configuration, of the inner ring raceway groove 2a and the outer ring raceway groove 3a, only the inner ring raceway groove 2a needs to be machined to form the cured surface layer, which is advantageous in the manufacturing.

The present invention is not limited to the embodiments described above, and modifications, improvements, and the like can be made as appropriate.

For example, the lubrication method of the angular ball bearing according to the present invention may be the oil air lubrication or the grease lubrication.

REFERENCE SIGNS LIST 1 angular ball bearing
2 inner ring
2a inner ring raceway groove
3 outer ring
3a outer ring raceway groove
4 ball
5 cage
10 cured surface layer

The invention claimed is:

1. An angular ball bearing comprising:
an inner ring that has an inner ring raceway groove having an arc-shaped cross section on an outer peripheral surface of the inner ring;
an outer ring that has an outer ring raceway groove having an arc-shaped cross section on an inner peripheral surface of the outer ring; and
a plurality of balls rollably provided between the inner ring raceway groove and the outer ring raceway groove,
wherein a groove curvature radius ratio (Ri) of the inner ring raceway groove to a ball diameter is 54% to 58%, a groove curvature radius ratio (Ro) of the outer ring raceway groove to the ball diameter is 51% to 58%, and Ri−Ro≥0, and
wherein at least the inner ring raceway groove includes a cured surface layer having a maximum surface pressure of 4.7 GPa to 6.0 GPa, the maximum surface pressure being a pressure at which a sum of permanent deformation amounts of the ball and the inner ring raceway groove at a center of a contact portion between the ball and the inner ring raceway groove is 1/10,000 of the ball diameter, the cured surface layer being formed by a surface curing processing.

2. The angular ball bearing according to claim 1, wherein Ri−Ro≥1.

3. The angular ball bearing according to claim 1, wherein the cured surface layer obtained by machining is formed on at least the inner ring raceway groove.

4. The angular ball bearing according to claim 1, wherein the cured surface layer obtained by machining is formed only on the inner ring raceway groove, among the inner ring raceway groove and the outer ring raceway groove.

5. The angular ball bearing according to claim 1, wherein a material of the ball is ceramic.

6. The angular ball bearing according to claim 1, wherein a ratio value of ball diameter/cross-sectional height is 0.39 to 0.65.

7. The angular ball bearing according to claim 6, wherein the ratio value of ball diameter/cross-sectional height is 0.55 to 0.65.

8. The angular ball bearing according to claim 1 being an angular ball bearing that is used for a machine tool spindle having dmn of 800,000 or more and that is pre-loaded.

9. The angular ball bearing according to claim 1, wherein at least one of the inner ring and the outer ring is formed of steel containing 0.2% by mass to 1.2% by mass of C, 0.7% by mass to 1.5% by mass of Si, 0.5% by mass to 1.5% by mass of Mo, 0.5% by mass to 2.0% by mass of Cr, balance Fe, and an unavoidable impurity element, and
wherein a surface carbon concentration is 0.8% by mass to 1.3% by mass, and a surface nitrogen concentration is 0.2% by mass to 0.8% by mass.

* * * * *